United States Patent [19]
Blake

[11] 3,960,172
[45] June 1, 1976

[54] CARTRIDGE MODULATING VALVE
[75] Inventor: William W. Blake, Kewanee, Ill.
[73] Assignee: Caterpillar Tractor Co., Peoria, Ill.
[22] Filed: Jan. 14, 1975
[21] Appl. No.: 541,038

[52] U.S. Cl. .............................................. 137/504
[51] Int. Cl.² ............... F16K 31/122; F16K 31/383
[58] Field of Search ..................................... 137/504

[56] References Cited
UNITED STATES PATENTS
3,145,730   8/1964   Presnell ........................ 137/504 X
3,710,820   1/1973   Simpson ........................ 137/504 X Primary Examiner—Henry T. Klinksiek
Attorney, Agent, or Firm—Phillips, Moore, Weissenberger Lempio & Strabala

[57] ABSTRACT

A modulating valve in a hydraulic control system of a vehicle transmission for communicating fluid under pressure to a load at a gradually increasing rate or for venting fluid under pressure at a gradually decreasing rate from the load.

6 Claims, 6 Drawing Figures

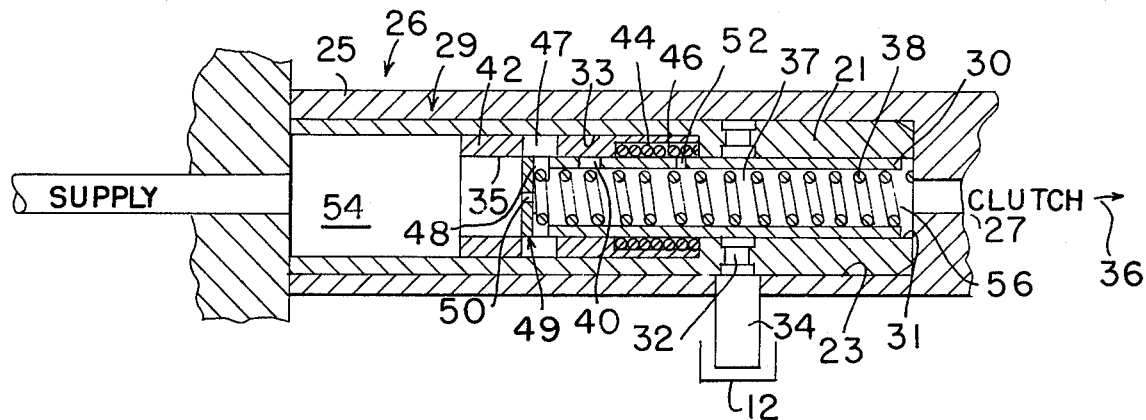
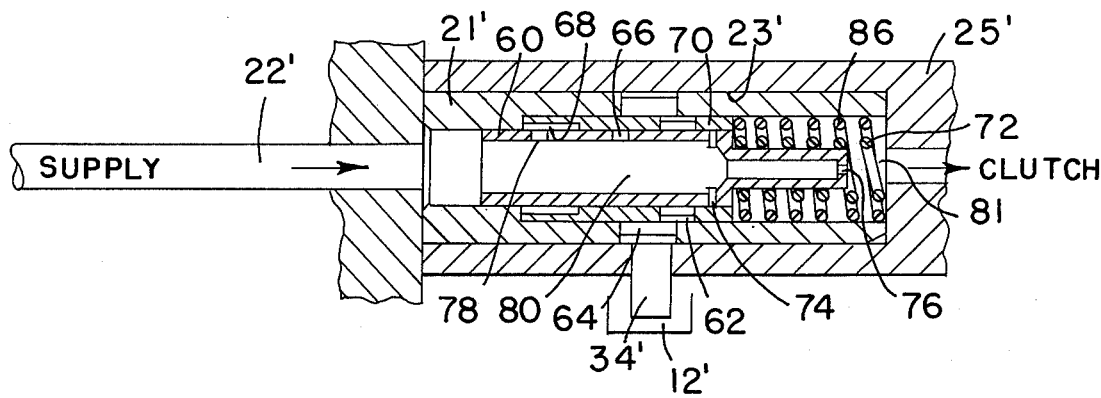
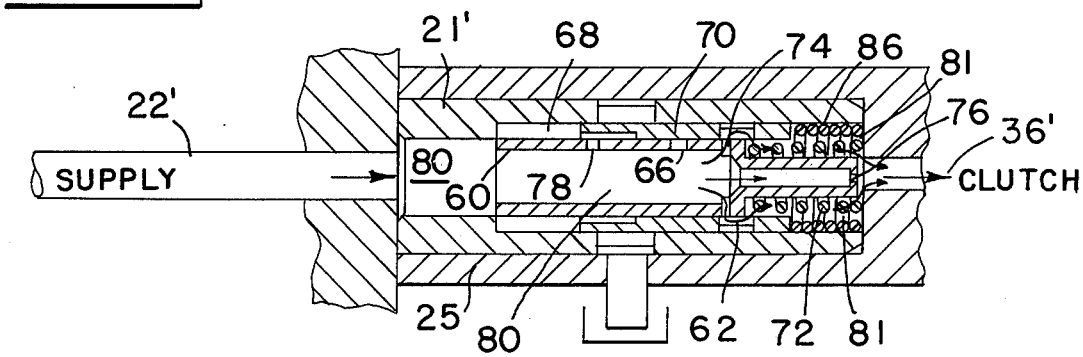

CARTRIDGE MODULATING VALVE

BACKGROUND OF THE INVENTION

Multi-speed transmissions requiring drive engaging devices such as clutches or brakes for each speed range or each direction are generally controlled by a hydraulic system. Each speed range or direction requires de-energizing one clutch or brake and energizing another clutch or brake. When a new speed is selected it may be desirable to de-energize both the direction clutch and the de-selected speed clutch. Engagement will generally take place with the new speed clutch energized first and the direction clutch energized later. This sequence may be selected because the direction clutch is of heavier construction and will absorb the shock of engagement with less wear on the working parts. The engagement sequence can of course be reversed with the direction clutch engaging first and the speed clutch engaging secondly if the speed clutch is of sturdier construction, or the speed clutch alone may be energized without de-energizing the directional clutch. Present hydraulic control systems solve this problem by a complex timing and modulating valve arrangement usually involving more than one valve and appropriate valve spools. Further, existing transmissions have generally placed the modulating means between the source pressure and the speed or direction range selectors thereby limiting the flexibility of the modulation valve means to one rate. This single modulating valve of course gives no flexibility to varying the rate of pressure increase or rate of pressure release in individual speed or direction clutches.

The complexity of existing modulating means is illustrated in U.S. Pat. No. 3,198,027 issued to Ramsel, et al and U.S. Pat. No. 3,386,540 issued to Horsch, et al, both patents assigned to the assignee of this invention. Simpler modulating means are illustrated in U.S. Pat. No. 3,091,976 issued to Johnson, et al (also assigned to the assignee of this invention). In all of these patents it is pointed out that the modulating is accomplished by a modulating spool working in concert with at least one other valve spool. It is also pointed out that by positioning the modulating means between the pressure source and the selector valves, the user is limited in the range of modulation available to the various drive engaging devices. Further, because of the complexity of the existing modulating means, when replacement or servicing is necessary to the modulating means the mechanic is presented with a rather complex problem. Finally cost of manufacturing of these rather complex valve arrangements is commensurately high.

SUMMARY OF THE INVENTION

Accordingly, it is the object of this invention to provide a modulation valve for modulation of pressure application to transmission drive engaging devices for smooth power engagement.

It is a further object of this invention to provide a modulation valve which while fulfilling the above object improves shift characteristics of the vehicle transmission.

It is still a further object of this invention to provide a modulating valve which while fulfilling the above objects provides a means for modulating pressure increases and decreases at each individual clutch according to the requirements of that clutch.

It is still a further object of this invention to provide a modulating valve which while fulfilling the above objects is simple and easily serviceable.

It is still a further object of this invention to provide a modulating valve wherein while fulfilling the above objects the supply pressure and clutch engaging pressures are approximately of equal value.

Broadly stated, this invention is a modulating valve means in a hydraulic system for communicating fluid pressure at a modulated rate to a load, the valve means comprising a valve housing, a cartridge container retained in the valve housing, a timing valve slidably contained within the cartridge container for controlling the rate of pressure build up at the load, and a check valve means slidably contained partly within the timing valve and partly within the cartridge container.

BRIEF DESCRIPTION OF THE DRAWINGS

These and other objects of the invention will become apparent from a study of the following specifications and drawings, in which:

FIG. 2B is a cross section of the same embodiment of the invention showing positioning of the elements at the commencement of the modulation phase;

FIG. 3 is a cross sectional view of an alternate embodiment of the invention showing the positioning of the elements when the clutch is in an engaged state;

FIG. 3A is a cross section of the same alternate embodiment showing the positioning of the elements while the clutch is being filled.

DESCRIPTION OF THE PREFERRED EMBODIMENT

Figure 1:
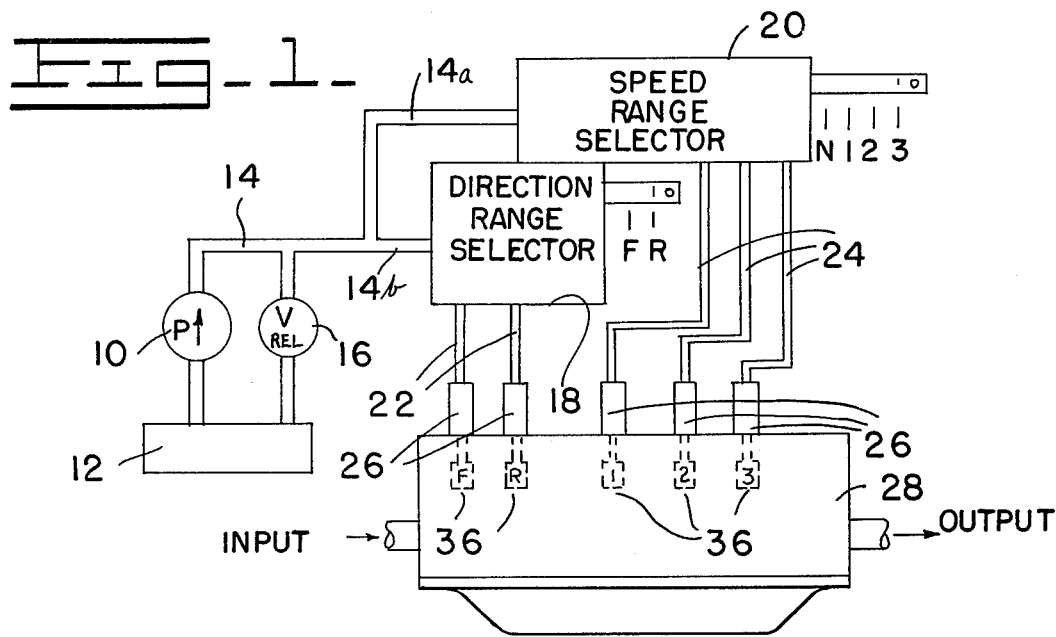
FIG. 1 is a schematic diagram of a representive hydraulic control system for a vehicle transmission.

Shown in FIG. 1 is a schematic of a representive hydraulic control system for a multi-speed transmission. A pump 10 draws fluid from a reservoir 12 and directs fluid to a conduit 14. A relief valve 16 maintains the pressure of the fluid in conduit 14 at a desired level. Fluid in conduit 14 divides into branch conduits 14a and 14b. Conduit 14b leads directly to a direction range selector 18 whereas conduit 14a leads to a speed range selector 20. When speed or direction changes are required, fluid pressure from conduits 14a and 14b is directed to the appropriate speed and direction supply conduits 22 and 24 by speed and direction selectors 20 and 18. From the appropriate speed conduit 22 and the appropriate direction conduit 24 fluid passes through cartridge modulating valves 26 before entering transmission 28 for pressurizing the appropriate direction engaging and speed engaging device 36. Even though modulating valves 26 are shown for each device 36, where modulation of the device 36 is not required the modulation valve 26 may be omitted.

Figure 2:
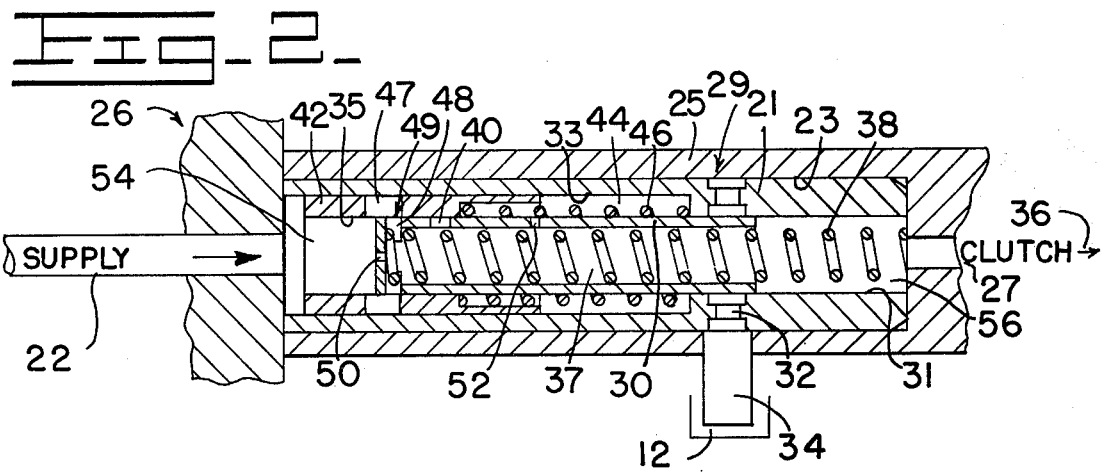
FIG. 2 is a cross section of the preferred embodiment of the invention showing the elements in the position assumed when the drive engaging device has been fully pressurized or fully relieved of pressure.

Referring now to FIG. 2, a cartridge container 21 is contained in bore 23 of housing 25, the container 21 and housing 25 defining housing means 29. Cartridge container 21 defines a first axial bore 31 and second axial bore 33, the first axial bore 31 communicating with the second bore 33 and the second axial bore 33 being of greater diameter than the first axial bore 31. The first axial bore 31 defines a first cavity 56, and the second axial bore 33 defines a second cavity 54. A sleeve timing spool 42 is slidably retained within the second axial bore 33 of the cartridge container 21. The sleeve timing spool 42 defines a third axial bore 35 of essentially the same diameter as the first axial bore 31, and a plurality of ports 47. Slidably retained within the axial bore 35 of the sleeve timing spool 42 is a spool check 30. The sleeve timing spool 42 is urged in a first direction by a first resilient means 46, and the spool 30 is urged in a similar first direction by a second resilient means 38. The spool 30, the sleeve timing spool 42 and the cartridge container 21 define a timing cavity 44. The spool 30 defines at one end an axial well 37, the axial well 37 communicating with the second cavity 54 through a modulating orifice 50. The spool 30 defines near the closed end of the axial well 37 a plurality of radial timing slots 48. Interposed between the timing slots 48 and the timing orifice 52 the spool check valve defines a relief passage 40. Fluid pressure is supplied to the modulating valve through conduit 22 and modulated fluid pressure is delivered to the load (in this case clutch 36) through load passage 27 defined by the housing 25. The cartridge container 21 and the housing 25 further define a drain orifice 32 communicating with reservoir 12 through conduit 34.

In operation, fluid is drawn from reservoir 12 and pumped under pressure by pump 10 to conduit 14. Pressure is relieved by relief valve 16 thereby maintaining a constant pressure in conduit 14. Conduit 14 branches to conduits 14a and 14b delivering fluid pressure to the speed range selector 20 and the direction range selector 18. Selection of the desired direction and the desired speed, accomplished by the operator, directs fluid to the appropriate conduit 22 and the appropriate conduit 24 and thence to appropriate modulator valves 26. Since all modulating valves operate in the same manner the operation of a single valve will be discussed.

Figure 2A:
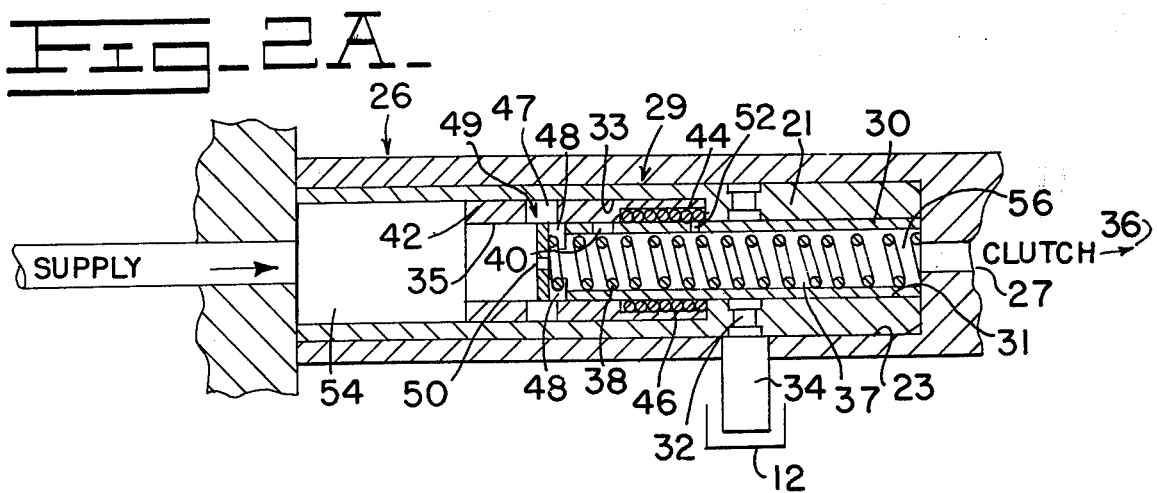
FIG. 2A is a cross sectional view of the same embodiment illustrating the positioning of the elements during the filling of the clutch.

Prior to the introduction of fluid pressure to a particular modulating valve the elements of the valve assume the position shown in FIG. 2. The spool 30, while in this position, blocks drain orifice 32. The relative positions of and the sleeve timing spool 42, referred to hereafter as the first relative position, provides communication from supply conduit 22 to load passage 27 through the second cavity 54, ports 47 and radial timing slots 48, (which together make up passage means 49), axial well 37 and the first cavity 56. Application of fluid pressure through supply conduit 22 to second cavity 54 urges spool 30 in a second direction against the force of second resilient means 38. Such movement in a second direction of spool 30 vents timing cavity 44 through relief passage 40 resulting in sleeve timing spool 42 being urged in the same second direction against the force of first resilient means 46. While in this position the spool 30 and the sleeve timing spool 42 are in a third relative position, wherein timing cavity 44 communicates with axial well 37 through relief passage 40, while radial timing slots 48 are blocked by sleeve timing spool 42. Movement of spool 30 and sleeve timing spool 42 continues in the second direction until the spool 30 engages housing 25 and sleeve timing spool 42 engages cartridge container 21 as shown in FIG. 2A. Spool 30 and sleeve timing spool 42 are then again in the first relative position, fluid being communicated from second cavity 54 through timing orifice 50 and ports 47 and radial timing slots 48 to axial well 37. As pressure builds up in clutch 36 and consequently in first cavity 56 such pressure augments second resilient means 38 thereby urging spool 30 in a first direction as indicated in FIG. 2B, such movement blocking communication from a second cavity 54 to ports 47. This position will be referred hereafter as the second relative position. Simultaneously fluid pressure is admitted to timing cavity 44 through timing orifice 52 thereby increasing fluid pressure in timing cavity 44 and augmenting the first resilient means 46 and starting the sleeve timing spool 42 moving in the same first direction. The relative sizes of modulating orifice 50 and timing orifice 52 and the relative resiliency of the first resilient means 46 and the second resilient means 38 determine both the relative rate of movement of spool 30 and the sleeve timing spool 42 in the first direction and therefore the rate of increase of fluid pressure delivered to clutch 36. However by standardizing either the orifice sizes or the spring rates, varying of the non-standardized components will easily provide varying pressure differential rates at each individual clutch.

Such movement in a first direction continues as pressure is built up in clutch 36. If during such leftward movement, movement of spool 30 is slowed or stopped due to a clutch leak, sleeve timing spool 42 will catch up, the members again adopting the first relative position, and allow make-up fluid to again pass through port 47 and radial timing slots 48 to axial well 37 thereby accomplishing modulation of clutch pressure in essentially the same time. When fluid pressure in the first cavity 56 and second cavity 54 are essentially equal, spool 30 and sleeve timing spool 42 again assume the position shown in FIG. 2 wherein the spool 30 and the sleeve timing spool 42 are in the first relative position and load pressure in conduit 27 will be essentially equal to supply pressure in conduit 22. In this position any fluid pressure lost to leakage at clutch 36 may be readily made up by passage of fluid through modulating orifice 50 and port 47 and radial timing slots 48, first cavity 56 serving as an accumulator for clutch 36.

Selection by the operator of a different speed engaging device or a different direction engaging device will immediately relieve pressure in supply conduit 22. The higher pressure in first cavity 56 urges spool 30 further in a first direction opening drain orifice 32 to conduit 34 and reservoir 12. Drain orifice 32 may be sized to time the decrease in pressure at drive engaging devices 36 thereby maintaining a degree of torque at device 36 while pressure builds up in the newly selected modulating valve.

An alternate embodiment of cartridge modulating valve is shown in FIG. 3. A cartridge container 21' is retained in bore 23' of housing 25'. Sleeve timing spool 70 is retained within an enlarged axial bore of cartridge container 21'. Spool 60 is retain in part in the axial bore of sleeve timing spool 70 and a smaller axial bore of cartridge container 21'. Modulating orifice 76 is located at the end of an extended axial well 80 defined by spool 60. Sleeve timing spool 70 is urged in a first direction by a first resilient means 86 and spool 60 is urged in the same first direction by a second resilient means 72. In the unpressurized state spool 60 and sleeve timing spool 70 are in the first relative position as shown in FIG. 3.

If pressurized, fluid pressure in supply conduit 22' urges spool check valve 60 further in a second direction communicating timing cavity 68 through relief passage 66 with the extended axial well 80, venting timing cavity 68 and insuring sleeve timing valve 70 is in its fully leftward position, ports 62 are opened to cavity 81 thereby venting clutch 36 through drain orifice 64 conduit 34' to reservoir 12'.

Application of fluid pressure to supply conduit 22' to energize clutch 36' urges spool 60 in a second direction thereby communicating fluid pressure from axial well 80 through radial slots 74 directly into cavity 81. Simultaneously fluid pressure is admitted to timing cavity 68 through timing orifice 78 starting movement of spool 70 in the same second direction. As pressure in cavity 81 increases movement of spool 60 is reversed thereby closing radial timing slots 74. Modulated pressure increase at clutch 36 is accomplished by sizing modulating orifice 76. Meanwhile sleeve timing spool 70 is continuing its movement in the second direction by pressure build up in the cavity 68 received through timing orifice 78. Such movement is controlled by resilient means 86, the pressure in cavity 81 and the size of orifice 78. As pressure in cavity 81 approaches pressure in extended axial well 80 radial timing slots 74 are again open to communication to cavity 81 through ports 62 as shown in FIG. 3A thereby insuring an adequate supply of fluid pressure to clutch 36 while in the engaged state. In this operating condition, spool 60 will act as an accumulator for the drive engaging device while returning back to position shown in FIG. 3.

What is claimed is:

1. In a hydraulic system, modulating valve means for communicating fluid pressure from a source at a modulated rate to a load, the modulating valve means comprising:

a valve housing defining an axial bore;

first conduit means for communicating fluid pressure from said source to a first end to said axial bore;

second conduit means for communicating fluid pressure from the other second end of said axial bore to said load;

a first spool slidably contained within said axial bore and defining an internal first axial spool bore;

a second spool slidably disposed within said first axial spool bore and defining an axial well and further defining an axial orifice communicating said first end to said second end;

resilient means urging said first and second spools toward said first end;

said first and second spools adapting a first relative position upon communication of fluid pressure to said first end, said first and second spools defining passage means associated with said first and second spools, said passage means for communicating fluid between said first end and said second end only while said first and second spools are in said first relative position;

means responsive to fluid pressure communicated to said second end to cooperate with said resilient means for providing said first and second spools adopt a second relative position upon a predetermined fluid pressure build up in said second end, said second relative position blocking said passage means and allowing communication of said fluid pressure from said first end to said second end only through said axial orifice.

2. The modulating valve means of claim 1 wherein the modulating valve means further comprise timing means for providing that the spools may adopt said first relative position as additional fluid pressure is supplied to the second end through said axial orifice subsequent to adoption of said second relative position.

3. The modulating valve means of claim 2 wherein the first spool further defines a counterbore forming with the second spool an annular timing cavity axially aligned with the first axial spool bore, further wherein said second spool defines a radial timing orifice communicating the axial well with said timing cavity, and further wherein the timing means for providing that the first and second spools adopt the first relative position comprise:

said timing cavity; and
   said timing orifice.

4. The modulating valve means of claim 3 wherein the first spool comprises a sleeve member defining near one end a plurality of radial slots, and wherein the second spool defines a plurality of radial ports communicating with the axial well and positioned between the timing orifice and the axial orifice, and further wherein the passage means associated with the first and second spools comprises said radial ports and said radial slots.

5. The modulating valve means of claim 4 wherein the resilient means comprises: a helical spring disposed in said axial well and engaging at one end the valve housing and at the other end the second spool; and a second helical spring disposed in said timing cavity and engaging at one end said valve housing and at the other opposite end said first spool.

6. The modulating valve means of claim 5 wherein said valve housing defines drain means for communicating fluid pressure at said second end to said hydraulic system only when fluid pressure in said second end substantially exceeds fluid pressure in said first end.

* * * * *